US007725533B2

(12) United States Patent
Szeto et al.

(10) Patent No.: US 7,725,533 B2
(45) Date of Patent: *May 25, 2010

(54) SYSTEM AND METHOD FOR ENHANCED MESSAGING INCLUDING A DISPLAYABLE STATUS INDICATOR RELATING TO ANOTHER USER AND AN ASSOCIATED PLAYLIST OR WEBPAGE

(75) Inventors: Christopher T. Szeto, Sunnyvale, CA (US); Vinod P. Dhomse, Milpitas, CA (US); Todd Beaupre, Los Angeles, CA (US); Pierre Schiro, Culver City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 11/937,324

(22) Filed: Nov. 8, 2007

(65) Prior Publication Data
US 2008/0065997 A1 Mar. 13, 2008

Related U.S. Application Data

(63) Continuation of application No. 10/832,557, filed on Apr. 26, 2004, which is a continuation-in-part of application No. 10/831,004, filed on Apr. 23, 2004.

(51) Int. Cl.
*G06F 13/00* (2006.01)
(52) U.S. Cl. .................................................. 709/203
(58) Field of Classification Search .................. 709/203
See application file for complete search history.

(56) References Cited

U.S. PATENT DOCUMENTS 6,161,132 A 12/2000 Roberts et al.

(Continued)

FOREIGN PATENT DOCUMENTS

KR 1020020078320 A 10/2002

(Continued)

OTHER PUBLICATIONS

Internet web page document from the network of the Pacific Ocean, address: http://www.pcconline.com.cn/pcedu/edu/softnews/cs/0404/359361.html—with English translation.

(Continued)

*Primary Examiner*—Robert B Harrell
(74) *Attorney, Agent, or Firm*—Greenberg Traurig, LLP

(57) ABSTRACT

A system and method for enhancing the experience of a user using a communication program over the Internet or other network. The system and method according to one embodiment utilizes a user's status indicator in a communication program to share content such as music or videos among users, and provides access to an electronic commerce application through which content may be obtained. One system and method according to the present invention allows a user to display an indicator and to set an actionable status message which indicates to other users the media content that the first user is experiencing. In another embodiment, a user is given the ability to access content that other users are listening to or viewing at that time. The system and method in an alternate embodiment broadcast metadata about the user's content to other users and the other users are able to utilize that metadata to receive and experience the same or similar content that the first user is experiencing. Access to an electronic commerce application through which content may be obtained is also facilitated.

3 Claims, 5 Drawing Sheets

U.S. PATENT DOCUMENTS

| | | |
|---|---|---|
| 6,321,252 B1 | 11/2001 | Bhola et al. |
| 2003/0065788 A1 | 4/2003 | Salomaki |
| 2004/0003090 A1 | 1/2004 | Deeds |
| 2005/0004985 A1* | 1/2005 | Stochosky .................. 709/205 |
| 2005/0004995 A1* | 1/2005 | Stochosky .................. 709/219 |

FOREIGN PATENT DOCUMENTS

| | | |
|---|---|---|
| KR | 1020030039045 A | 5/2003 |

OTHER PUBLICATIONS

Supplementary European Search Report EP 05 73 9789 date Feb. 5, 2009.

* cited by examiner

SYSTEM AND METHOD FOR ENHANCED MESSAGING INCLUDING A DISPLAYABLE STATUS INDICATOR RELATING TO ANOTHER USER AND AN ASSOCIATED PLAYLIST OR WEBPAGE

CROSS REFERENCE TO RELATED APPLICATIONS

This application is a continuation of application Ser. No. 10/832,557, filed Apr. 26, 2004, which is a continuation-in-part of application Ser. No. 10/831,004 filed Apr. 23, 2004.

BACKGROUND OF THE INVENTION

1. Field of the Invention

The present invention relates generally to a system and method for messaging.

2. Description of Related Art

The expansion of the Internet and the worldwide web ("web") has provided computer users with an enhanced ability to communicate with one another, such as by e-mail, chat and instant messaging, to name a few methods. Instant messaging has become a popular form of communication in recent years. In an instant messaging system, two users are able to communicate with each other in real time or near real time by passing messages as well as other information, such as files, over the Internet. In an instant messaging system, the messages are generated and displayed using an instant messaging client software program that resides on each user's computer. In some instant messaging systems, other information about the user, such as a profile or his or her status (e.g., whether the user is online, offline, busy) can be shared with other users of the instant messaging system.

Although instant messaging has become popular, it still does not utilize the global reaches of the Internet to the fullest extent possible. Although useful in exchanging text messages and files, current instant messenger platforms do not have the capability of sharing other practical information among users. While a user is utilizing their instant messaging program, they can also be doing numerous other things both at their computers and over the Internet. Current instant messaging programs do not allow users to easily share this experience with other instant messaging users.

SUMMARY OF THE INVENTION

When one user is making use of a particular application on a computer or over the Internet, it would be advantageous if he or she could let other users know what application they were using and easily share that experience with other users. Thus, for example, if a user were experiencing a particular item of media, for example a song or video clip, via a media player, it would be advantageous if another user could obtain information about the music being listened to and even listen to the same song, playlist, radio station or genre of music. This would create an additional level of shared experience between users that would allow for enhanced communication that goes far beyond the mere sharing of text messages and the like.

The present invention provides a system and method for enhancing the experience of a user using a communication program over the Internet or other network. In one embodiment, the experience of an instant messaging user is enhanced by utilizing a user status indicator in an instant messaging system to facilitate the sharing of the experience of content such as music or videos. One system and method according to one embodiment of the present invention allows a user to display an indicator and/or to set an actionable status message which alerts other users to media content that the first user is experiencing.

In one embodiment a user is given the ability to access the same or similar content that other users are listening to or viewing or otherwise experiencing at a particular time. In operation, the instant messaging system makes available data or metadata about the content a user is experiencing at a given time. Other users are then able to utilize that data or metadata to receive and experience the same or similar content that the user is experiencing or get more information related to the media or content. In one embodiment, a the system performs a check to discern whether the other user making the request should be granted access to the particular content taking into consideration the appropriate digital rights.

DETAILED DESCRIPTION OF PREFERRED EMBODIMENTS

In general the present invention relates to a system and method for enhancing an experience among intercommunicating users to thereby engender affinity between users and a provider of the system and/or method. In certain exemplary embodiments, a system and method is described which enhances the user's experience by allowing improved inter-relationships and activity sharing between users of an instant messaging system.

Figure 1:
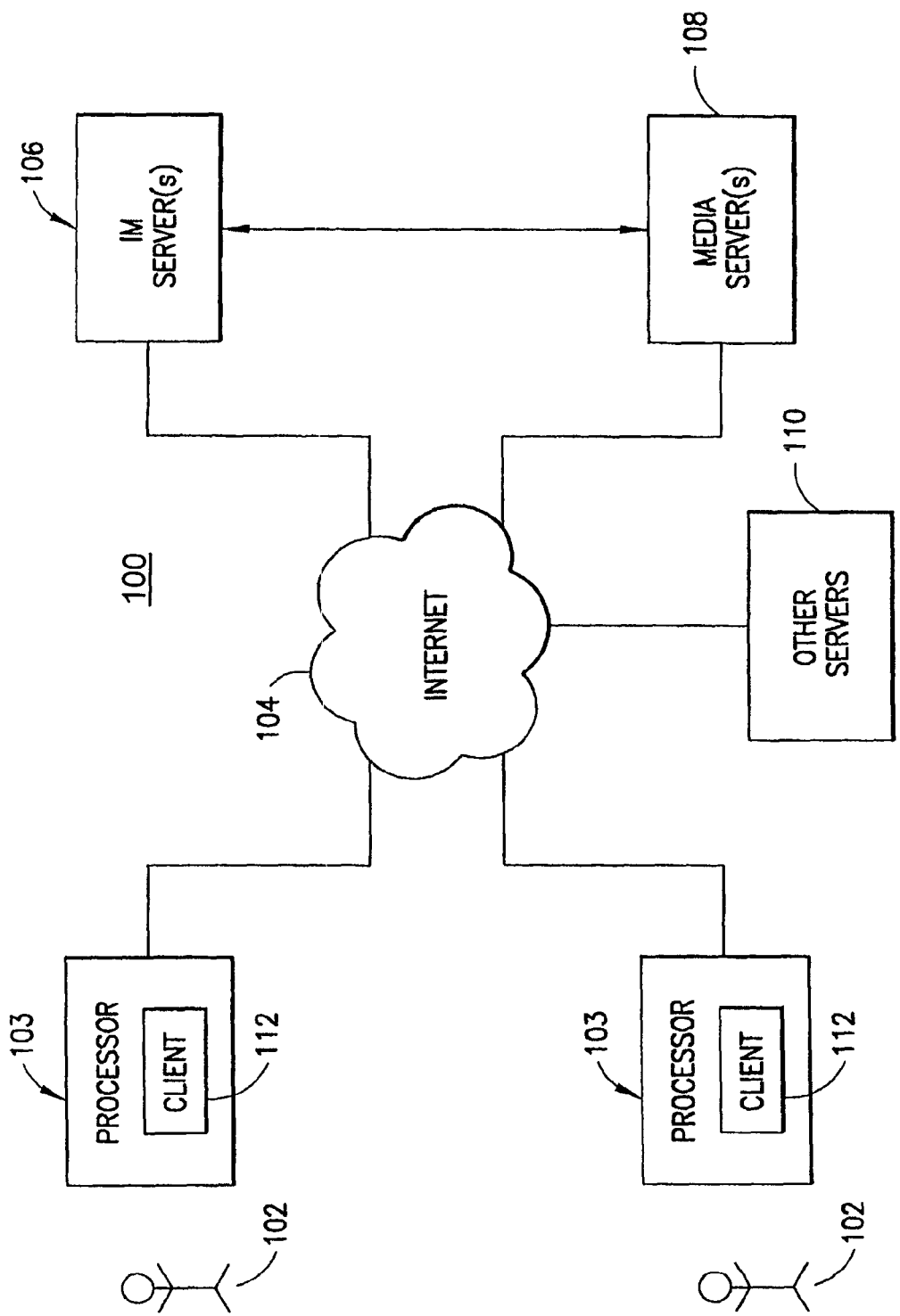
FIG. 1 is a schematic illustrating an exemplary system architecture of one embodiment of the present invention.

Certain embodiments of the present invention will now be discussed with reference to the aforementioned figures, wherein like reference numerals refer to like components. Referring now to FIG. 1, the architecture of one embodiment of the present invention is shown in schematic form. As can be seen in FIG. 1, a system 100 according to one embodiment of the present invention is shown. In general, the system 100 allows users 102 to communicate with each other through the Internet utilizing an instant messaging platform as well as to share different information and data amongst themselves.

Each user 102 has a processor 103, such as a personal computer (PC), web enabled cellular telephone, personal digital assistant (PDA) or the like, coupled to the Internet 104 by any one of a number of known manners. Furthermore, each processor 103 preferably includes an Internet browser (not shown), such as that offered by Microsoft Corporation under the trade name INTERNET EXPLORER, or that offered by Netscape Corp. under the trade name NETSCAPE NAVIGATOR, and a media player (not shown), such as that offered by Microsoft Corporation under the trade name WINDOWS MEDIA PLAYER, or that offered by Real Networks Corp. under the trade name REAL PLAYER, or the software or hardware equivalent of the aforementioned components that enable intercommunication between users and service providers, among users, and that provide the ability to convert digital information or data into a perceptible form. In the described embodiment, processor 103 runs an instant messaging client software program 112 that is used to communicate with an instant messaging server 106 and exchange messages between users. One such example of an instant messaging client is Yahoo! Instant Messenger, or any other instant messaging client now known or hereafter to become known. It should be appreciated that although this embodiment is described in terms of an instant messaging client, it can also utilize other forms of communication over the Internet heretofore or hereafter known. It should also be understood that although the present embodiment is described in terms of media content and specifically audio content, it is within the scope of the present invention to utilize any content or media format heretofore or hereafter known. Furthermore, it is to be understood that although the present embodiment is described within the context of streaming media, the present invention is applicable to digital content other than streaming media as well and could be an Internet destination reached via a URI or URL.

As will be discussed in greater detail below, the system 100 includes instant messaging (IM) server(s) 106 as well as media server(s) 108. Other servers 110 may also be accessible. The IM servers 106 act to exchange messages between users 102, as well as to pass along other information to both the users 102 and the media server 108. In addition to exchanging information with IM server(s) 106, media server(s) 108 store music content as well as stream various forms of music content to be received by users 102. Other servers 110 make other content and services available, and may provide administrative services such as managing user logins, service access permissions, digital rights management, storing user profile and preference information, and other services made available by a service provider. It should be appreciated that although some embodiments of the invention are described in terms of music, the embodiments can also encompass any form of streaming or non-streaming media including but not limited to news, entertainment, sports events, or any other webpage or perceptible audio or video content.

As illustrated in FIG. 1, the users 102, the IM server(s) 106 and media server(s) 108 and other servers 110 are communicatively connected via the Internet 104. In alternate embodiments, different components of the system may be coupled differently, for example, each may be coupled directly to each other wirelessly or via an intranet or wide-area network (WAN) or the like.

Users 102 utilize the instant messaging client 112 on their processors 103 to communicate with other users via the instant messaging server(s). As can be seen from FIG. 2, while using an instant messaging client, the user is given the ability to interact with other users, by, for example, typing messages or sending files to another user. In addition to enabling a user to perform different functions (e.g., sending messages and/or items to another user, accessing web sites) in one part of the instant messenger window 202, the instant messaging client also enables a user to compile a "list of friends" 204 or in other words, other users with which the user is acquainted. The instant messaging client displays a list of these other user's names, so that the user may easily access a group of other users with whom the user is in frequent contact. For example, in a known manner, by clicking on a friend's user name, the user will be able to send an instant message to his or her friend. Additionally, when clicking on a friend's user name, other data about the user such as hobbies, likes, dislikes, or other information that the user has provided to the system can be displayed or made accessible. In addition, a user can group his or her friends into further categories (e.g., family, friends, etc.).

In certain known embodiments of instant messaging programs, each user is given an option to set their status. For example, possible status indicators may include "available," "idle," "busy," "be night back," "not at my desk," "on vacation," or "out to lunch." When a user chooses to set his or her status, the user's id is flagged with a corresponding status indicator 224. Any other user that wishes to either instant message the first user or just wishes to obtain the first user's status, will be informed of the status chosen by the first user. For example, if user Cris flags his status 224 as "busy," any other user that has identified user Cris their respective "friends list" or who wishes to view Cris's status or wishes to send an instant message to Cris will be advised through the status indicator 224 visible to the other user that Cris is "busy." It is to be appreciated that the use of status indicators creates an atmosphere where each user can easily make available their status to other users without having to individually tell each user that, for example, he or she is busy. A user may set his status by choosing from a drop-down list or by using other widely known methods of selecting an item within a computer environment.

In various different atmospheres, different known status indicators can include various indicators regarding location of the user (e.g., home, work), what the user is in the middle of doing (e.g., busy, on the phone), what mood the user is in (e.g., sad, happy) or other details about the user. In the alternative, the user may choose to identify his status as invisible which will hide the user from other users and it will appear to other users as if the first user is not connected to the system.

In another known embodiment, the user may also personalize a particular status as opposed to choosing one provided by the system. For example, a user may set a personalized message (e.g., good day to you all) as his or her status. Additionally a status indicator might be a universal resource locator (URL) or a hyperlink to another application. For example, one user might provide a link to their favorite website as his or her status indicator. When another instant messaging user would click on the first user's status indicator (e.g. the URL or link), the user will be directed to the website represented by that URL or link. In other embodiments additional applications and/or programs might be utilized through the status indicators. For instance, if a user has a web camera on their home computer, they may include a message in their status indicator that states for example, "view my web cam." When another user clicks on that status message, the image from the web camera will be displayed. In other embodiments, pictures or icons 210 may be displayed alongside the status indicator. For example, a picture of a camera can be displayed next to a status indicator that directs a user to another user's web cam, or a bright smiley face may indicate that the user is on the system, or a time clock may indicate that a user is idle. Other operations can be made available via buttons 224 or other interface options such as menus or hot links.

In operation of an embodiment of present invention, the instant messaging client 112 on user 102's computer 103 maintains a list of icons, messages or other information that can be displayed as a user's status indicator, or can obtain such information or indicators from IM server 106. When the IM server 106 determines that a change of status indicator is appropriate, for example because a user has logged off the system or the user has notified the system that they are busy for example, the IM server 106 recognizes this change in status and passes this information along to the instant messaging client on the other user 102's computer. The instant messaging client applies the applicable status indicator to the other user's display, and in this manner each user is able to view the updated status of other users.

In one embodiment of the present invention, (See FIG. 3) the user of the system is enabled to listen to music over the Internet through a user interface presented by the messaging client (or other streaming media application), which interface contains a messaging portion and a media player portion. This embodiment enables a user to share a music experience or the type of music that he or she is listening to with other users. In this embodiment, users are able to utilize a streaming media service (such as for example Yahoo!'s Launchcast™) within the media player portion of the instant messaging user interface. As can be seen from FIG. 3, an exemplary instant messaging user interface is divided into a media player section 304 and a messaging section 312 for the user to allow the user to control access to and the experiencing of streaming media via a media player application while at the same time maintaining instant messaging capabilities.

Figure 2:
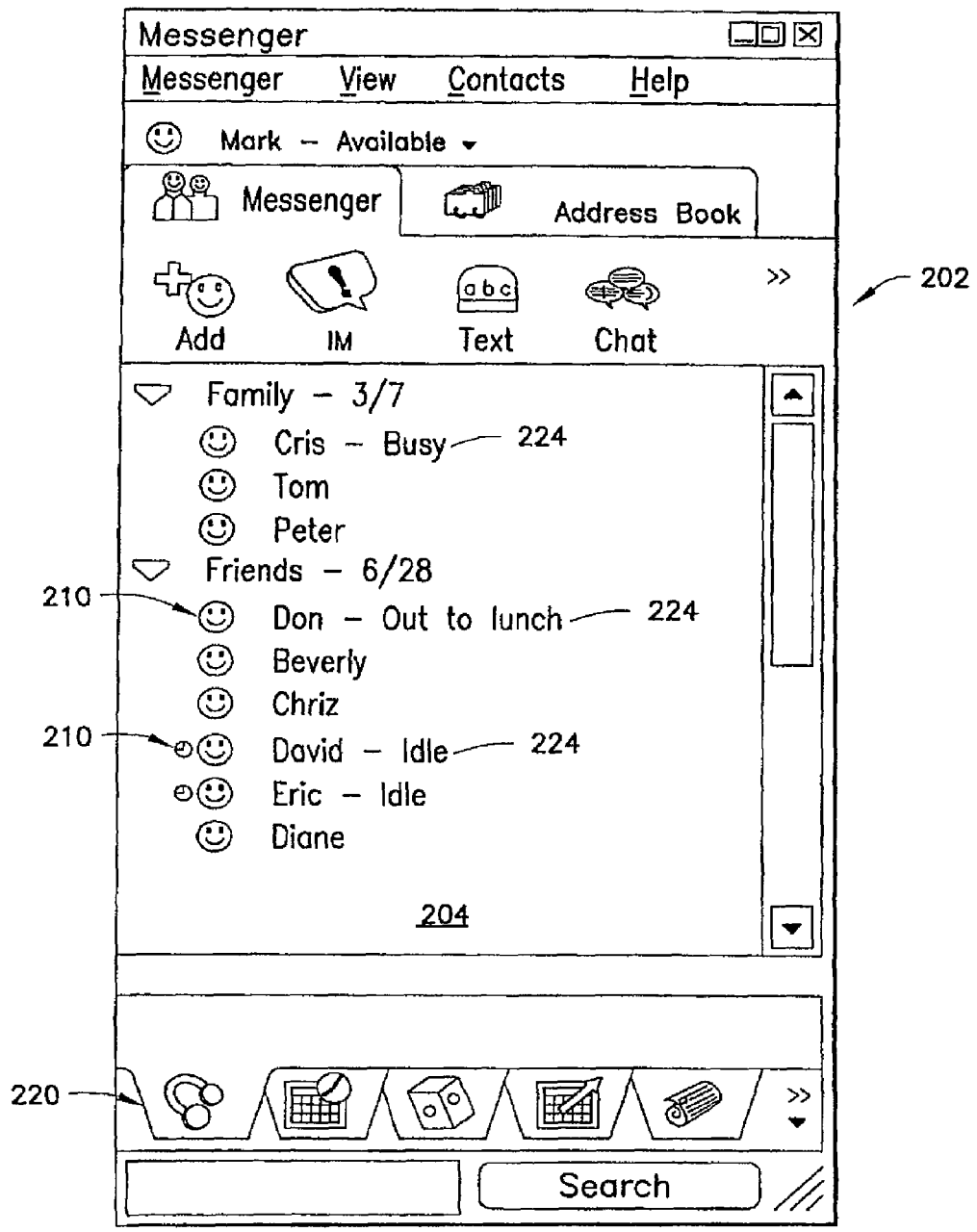
FIG. 2 is an exemplary user interface of an exemplary instant messaging client according to one embodiment of the present invention.
Figure 3:
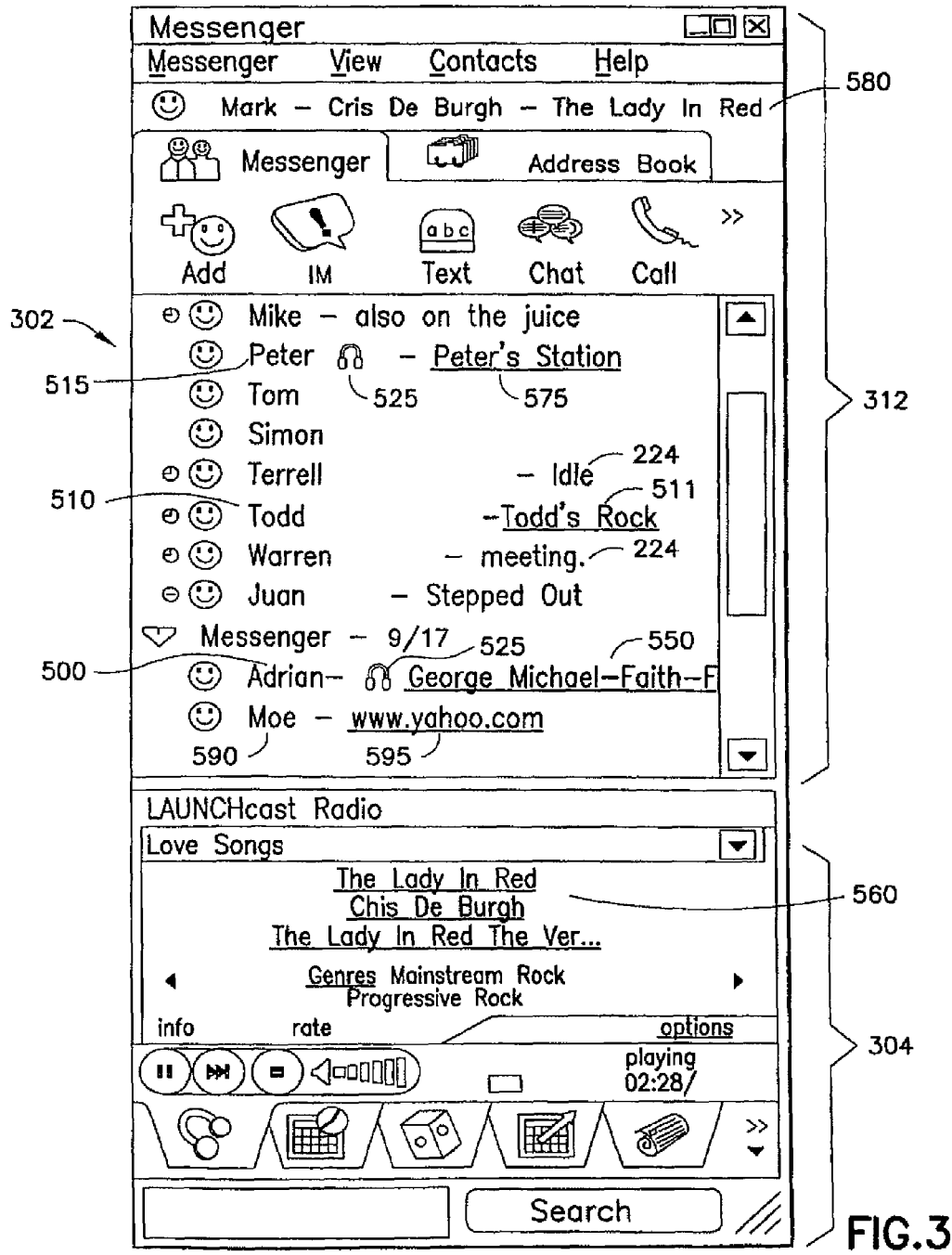
FIG. 3 is an exemplary user interface portion of an exemplary instant messaging client according to one embodiment of the present invention.

The use of a media player and/or service such as Launchcast™ within an instant messaging system will now be described in more detail. Referring to FIG. 3, a user that is utilizing an instant messaging (IM) client and wishes to listen to streaming media utilizing a media player within the instant messaging client is provided via known programming techniques with a media player within the user interface of the instant messaging client. In one embodiment, as seen in FIG. 2, access to the media player can be enabled by clicking the button or tab containing an icon depicting a media-related image such as headphones 220 at the lower portion of IM window 202 or some other user interface choice.

Once the user (in the depicted example "Mark") chooses to utilize the player within the instant messaging client, as seen in FIG. 3, the upper portion 312 of the instant messaging client 302 displays his friends list and provides "conventional" instant messaging functions to users (e.g., chatting, Instant Messaging, seeing another user's status, etc.) as well as new features described herein. The lower portion 304 of the IM window 302, however, is transformed into a media player through which a user may play or otherwise experience the streaming media that has been requested and sent from media servers 108 in known manners. It should be appreciated that this results in the added benefit of being able to combine a user's instant messaging experience with a media playing experience. It should also be appreciated that all of this preferably transpires seamlessly from the user's perspective, further enhancing the instant messaging experience. In other embodiments, the player can be located in a different location within the instant messaging window or can be located outside of the messaging window or screen portion in a separate window or screen portion. In one embodiment the song 560 that the user "Mark" is experiencing through the media player is listed next to "Mark's" name at 580 in the upper portion 312 of IM window 302.

Thus, by way of further example as seen in FIG. 3, and further described herein, a user 500 is identified with a status indicator 525 that indicates that user 500 is listening to music, while the same or a different indicator preferably identifies the name 550 of the particular song that user 500 is listening to. Thus, the user's displayed status indicator is interconnected with and indicative of the user's actual experience while using the inventive system and method.

As can further be seen in FIG. 3, a user's status indicator can be utilized to allow other users to view the title of a song that a particular user is listening to. For example, as can be seen in the upper portion 312 of the instant messaging display 302, if user "Adrian" 500 is listening to the song "Faith" from the album "Faith" by George Michael, "Adrian's" song status indicator 550 will show "George Michael—Faith—Faith" indicating the artist, song and album. Therefore, other users will know that Adrian is currently listening to that song. In addition to the name of the song, the artist, and the album, the song status indicator 550 is preferably a hyperlink, or a separate hyperlink could be displayed near the status indicator. Thus, if a user utilizing the IM client displaying IA window 302 (in this instance "Mark") wishes to listen to the same song that user "Adrian" is listening to, user "Mark" would click on that song name 550 hyperlink. When "Mark" clicks on that hyperlink, he would then receive through his media player the song or portion of the song that "Adrian" is listening to, as will be explained in further detail with reference to FIG. 4. Alternatively, an individual user can choose how their music status message appears. For example, instead of listing the song and the artist, a user may insert a personalized message or possibly no message at all, but rather just a link to the song.

An exemplary method of effectuating the above-described embodiment will now be described. IM server 106 stores, obtains and/or makes available data and/or metadata that is represented in whole or in part by status indicators 525, 550, or a combination thereof As used herein, data and metadata are used interchangeably. This "augmented" status indicator can represent the data associated with other status indicators such as for example a custom status message, category of status, and text for the status indicator. In addition to the data represented by the standard status indicator, the "augmented" status indicator also represents metadata related to the status. For example, in the case of an instant messaging user 500 who is listening to streaming media and wishes to share the listening experience with other users, the augmented status indicator will relate to and represent information such as, for example, a song identifier, which may comprise the identity of the artist, song title, album name, reviews, popularity information, or other information related to the song or item of media content, for example a user identifier, a popularity rating of a song or media item, or any other information that the player or messaging program would need or can utilize in order to stream the song or other media or provide additional information to the user. This relationship between data and the status indicator allows a user 500 to indicate to various other users, simultaneously, that song 550 is the song that he or she is listening to, and also in turn provides to those other users access to data and information associated with that indicator. Conversely, this also allows a single user to be able to view a list of the songs that his or her friends are listening to. A user need not install any new programs or plug-ins, nor does the user need to be running any additional software to find out what another user is listening to, but rather the user utilizes the instant messaging program and friend list functionality herein described to access this information. Further, each user 500 does not need to manually adjust their song status indicator 550 to indicate the song that they are listening to, but rather the system displays that information automatically as the user receives and experiences each new song or other media item, as a result of data arriving from the servers to the client software. It should be understood that this embodiment easily allows each user the benefit of being able to utilize an instant messaging "friends list" to instantly access data and information about music being experienced by each of their listed friends. The status indicators change as the user's listening experience changes. So, for example, referring again to FIG. 3, if user Adrian 500 finishes listening to the song Faith and is now listening to the song Teen Angst by the group Cracker, Adrian's status indicator would be updated to all users having Adrian on their friends list to reflect this new song title and artist. The amount of information contained in a status indicator is controllable either by the system provider, media provider, software provider, user, or some combination thereof, as is the amount of data represented by or accessible from that indicator.

It should be appreciated that although the above discussion is described in terms of a particular song, the present invention can alternatively or simultaneously include the ability to listen to a variety of songs such as in a playlist. For example if the first user Todd 510 is listening to a particular playlist "Todd's Rock" which includes a variety of songs in sequence or at random, a status indicator 511 could display the name of Todd's playlist and allow another user to click on that playlist and listen to any or all of the songs in Todd's playlist. Once again, limits can be optionally set by the user or the messaging program provider as to how many songs in the playlist the second user is permitted to listen to (e.g., only the first song in the playlist, or only five songs from the playlist), or the order in which the songs are played, or other limits or manipulation of the playlist content.

In another embodiment, a user of the system of the present invention is able to listen to a "radio station" that another user is listening to in addition to merely a particular song or video. As is known in the art, applications exist that permit a user to create a personalized "radio station" that can be set up to stream media to the user that conforms with the user's selected preferences. An exemplary Internet website featuring the use of an Internet radio is that of Yahoo! Launch. Within the radio system, a user can set up a radio station that will, in accordance with a preprogrammed algorithm, conform to the preferences selected for that user's station. For example, if a user desires to hear a particular genre of music (e.g., jazz or rock), or identifies artists or albums that he or she enjoys, then the algorithm applied to that user's station will be influenced by the user's preferences.

In one embodiment of the present invention, if user Peter 515 has utilized a service to create a radio station that plays music in accordance with Peter's preferences, which Peter calls "Peter's Station", the status indicator 525 associated with Peter preferably also reflects the user's radio station identity, i.e. Peter's Station 575. Thus, when another user clicks on Peter's status indicator 525, or the Peter's Station indicator 575 which reflects the radio station 575 being listened to by Peter 515, the same or similar algorithm to that which controls and serves media for Peter's Station will be utilized to stream content to that other user. It should be appreciated that this has the added benefit of not only allowing a user to share a particular music experience in the form of a song that he or she is listening to with another instant messaging user, but it also provides added flexibility in allowing a user to share a particular radio station or, in other words, particular criteria that the user has already set up in a radio station he or she is currently listening to or simply wishes to share whether or not listening to that station at the time the second user selects it.

Thus if another user clicks on the status indicator 525 or the name 575 which indicates Peter's radio station, the system will use Peter's radio station preferences to choose songs for the other user and will pass along such songs to the user. Also, if the radio system is a subscription system and different users are allowed varying access to different stations, the particular station may or may not be available to a particular user. In such instance, the IM server 106 or media server 108 or other server 110 or the client software can be configured to control access to the various available media so that users are restricted to media in accordance with preselected criteria such as subscription level, content restriction (adult versus minor), or other criteria selected by the user, content or service provider, or some combination of those entities.

In alternate embodiments link 575 need not be a static URI or one related solely to media, but can be dynamically changing to indicate the URI of a webpage being viewed by a user. Thus, referring again to FIG. 3, if user "Moe" 590 is currently viewing the homepage for website Yahoo!, "Moe's" status indicator 595 can reflect the URI of that page. Status indicator 595 will change as "Moe" surfs to different pages and "Moe's" friends can click along and share Moe's browsing experience. In such instance the URI of a user can be tracked by the IM client, passed to the IM client by a browser, or made available in some other manner to be passed on to IM server 106 to enable updating of a user's status indicator as that user "surfs" the web, in the same manner that a song, playlist or radio station status indicator changes in accordance with user's listening changes.

Figure 4:
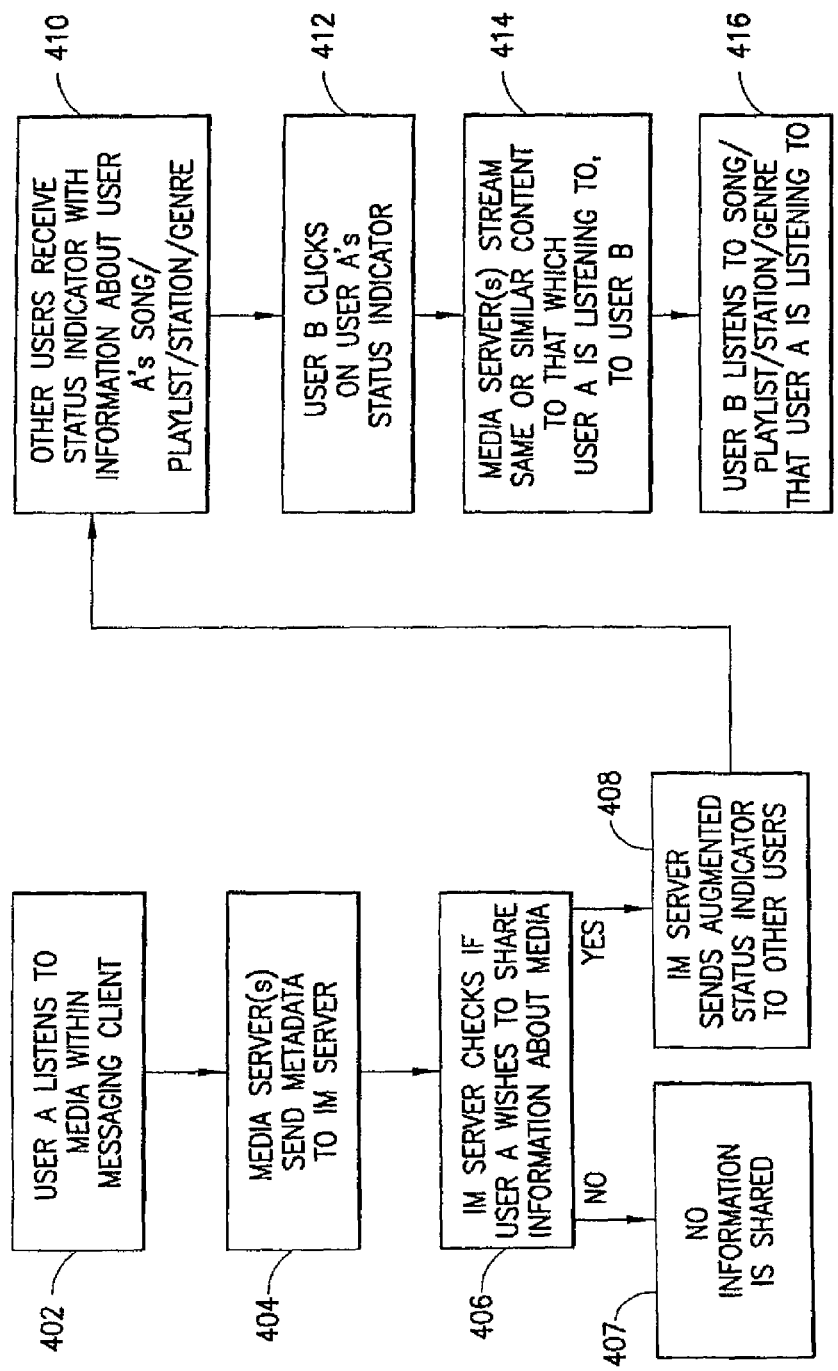
FIG. 4 is a schematic illustrating an exemplary process workflow according to one embodiment of the present invention.

An exemplary method of sharing a media experience by another instant messaging user according to one embodiment of the present invention is depicted in the flowchart of FIG. 4. For example if User A is listening to a song with a player 304 that is within their instant messaging client display 302, Step 402, the media server 108 passes metadata about the song (e.g., song ID) user ID or other data described herein) to IM server 106. Step 404. Once the IM Server receives the metadata about User A's song, the IM server may optionally check User A's settings to determine whether User A wishes to share information about the song that he or she is listening to with other users. Step 406. It should be understood that in different embodiments, users are allowed to choose which information or data they wish to share with which users, or alternatively, the service provider can control access based on preselected user criteria or other criteria, for example through login control and subscription levels. If it is determined that User A does not wish to share any song information, or other system parameters indicate no information sharing should occur, then no information is shared. Step 407. If it is determined that User A wishes to share his or her song information with other users (e.g., User A's friends), or if based on other criteria such information sharing is permitted, the IM server sends a status indicator representing the media with the media metadata to those users that User A wishes to share the information with (e.g., User A's friends). Step 408. Any user that is in the group of users that User A wished to share his or her media data with will be able to view the status indicator (e.g., element 525 of FIG. 3) and a display of the name of the song and/or artist (e.g., element 550 of FIG. 3) as was discussed above with reference to FIG. 3. Step 410. If for example User B wishes to experience the same media that User A is experiencing, User B would click on User A's status indicator 525 or indicator 550, or these indicators can be displayed as one indicator. Step 412. Once User 13 clicks on that link 550, the media server(s) begin to stream User A's media to User B. Step 414. User B is then able to experience the same media that User A was experiencing on his or her player that is embedded within or operating along with his or her messaging client 304. Step 416. It should be appreciated that in different embodiments various checks can be performed by the system to determine whether each user's messaging client and/or player is capable of receiving the media content that is being streamed. For example, the system may check if the user is running another media player on his or her system or listening to another song. If the user's player is not available, the system can also alert the user that he or she is already using the media player and must close the player to access this new song, or alternatively, the system may close the open player or open an alternative player with or without alerting the user. Also, as described above, the indicator need not reflect a song, but can indicate a genre of music, a playlist, a radio station, a video, a URI, or other link to experienceable content a user wishes to experience along with another, and the indicator can be a combination of words and graphics, e.g. a picture of headphones and a song title.

In another embodiment, the system checks whether the user has appropriate rights to access the media that the first user was experiencing. It should be appreciated that this embodiment can include users with different levels of access or subscriptions and therefore one user may not be permitted to access every item of media that another user is experiencing or is capable of experiencing. In alternate embodiments, the media that is streamed to a second user will not be streamed in its entirety, or will or will not be streamed at the same time to both users. In other embodiments, the media may be abridged.

It should be appreciated that although the above description details playing media from a player within an instant messaging program, one embodiment can pass information regarding media being played from a media player distinct from the instant messaging program, by virtue of the instant messaging program containing an application that can capture URI or stream information from an existing, non-embedded player or browser.

Figure 5:
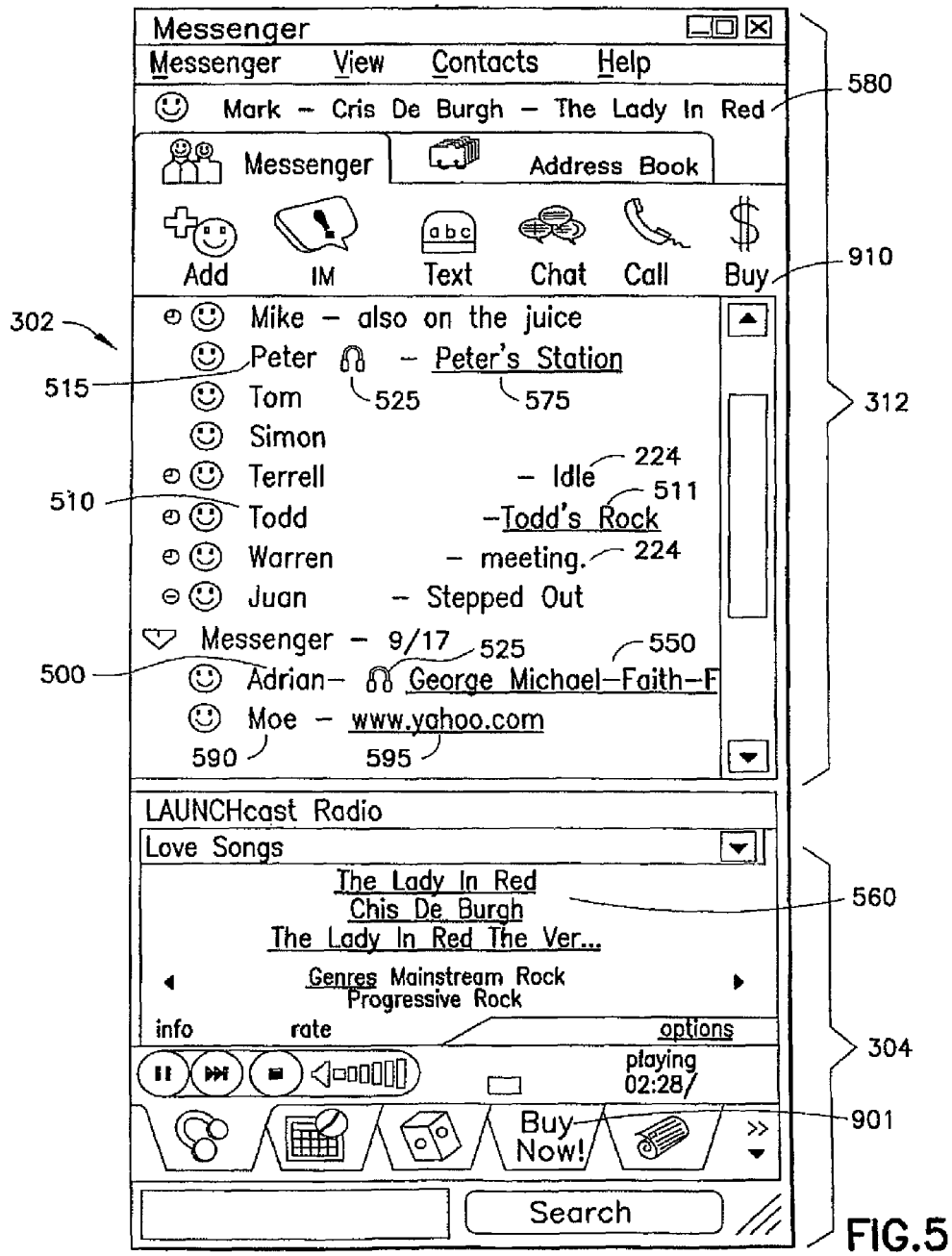
FIG. 5 is an exemplary user interface portion of an exemplary instant messaging client according to one embodiment of the present invention.

With reference to FIG. 5, an additional embodiment incorporates the provision of electronic commerce features and functions into the system and method of enhanced messaging described herein. For example an additional icon, which may be by way of nonlimiting example in the form of a button or link or other selectable user interface element through which a user can interact with a program, can be provided by which a user can access electronic commerce features and systems that would facilitate the user obtaining content. For example a user could gain access to an electronic commerce application on a website or elsewhere to perform the on-line purchase or download of songs, albums or other materials or items of media that a user finds interesting as a result his or her experience with the enhanced messaging system and method as described herein. Thus, a button or link 901 may be provided in lower portion 304 of the messaging user interface 302 which would permit a user to satisfy a desire to make a purchase while the user was experiencing an item of media using the messaging program. Thus, with continued reference to FIG. 5, if user "Mark", as referenced in an aforementioned example above, were to be listening to the song called "The Lady In Red", and wished to purchase a copy of that song, or a copy of the entire album that contained that song, or wished to purchase other media performed or involving the performing artist or similar artists and/or artists in the same or similar genre, Mark could click on button or icon 901 and be directed or linked to a shopping site through which Mark's purchase could be satisfied. In a preferred embodiment, at or near the time that the purchaser clicks the purchase icon 901, some or all of the data associated with the item of media being experienced by the potential purchaser would be transferred to the shopping site so that the shopping site may make use of the transferred data to present information to the user that would more readily facilitate the purchase of the item being experienced when the click takes place. Thus, continuing with our example of our user Mark, if he were to click the "buy now" icon 901 as seen in FIG. 5, Mark would be directed, through a browser or other application programming interface that would permit interaction with a commerce provider, to an electronic commerce site that would preferably display a purchase page containing information for the purpose of directing Mark in his potential purchase for either the song called The Lady In Red that Mark was listening to, and/or other items of purchasable media connected with the artist Chris De Burgh, and/or information pertaining to related genres and/or other similar songs, artists and the like. The system and method described herein can be flexibly configured to utilize the data associated with items of media to enhance a user's shopping experience should the user desire to purchase or otherwise obtain items of media while they are experiencing them, or sometime after if the system is configured to save information related to media experienced by the user at a previous time. Thus it can be seen that the system and method of this embodiment can provide significant purchasing potential to a commerce provider by providing the functionality of new and immediate gratification of an impulse purchase based on a user's satisfaction with media experienced by the user through interaction with the enhanced messaging system with commerce capability as described herein.

Alternatively, an additional or sole button or link 910 can be included in the upper portion 312 of the messaging interface 302. As described above in connection with icon or button 901, that functionality described above can be provided through the alternately placed icon 910 alone in upper portion 312. This would be useful if, for example, the media player portion were not incorporated as part of user interface 302. Alternatively the additional icon for commerce access can be provided at any location within or outside the interface 302, such as for example proximate the identifier of the item of media being experienced. Alternatively, icon 901 or 910 can be implemented in a manner such that when the button or icon is selected by a user, the user is presented with a query requesting the user to identify which item of media they wish to purchase, for example the item of media that user is currently experiencing or alternatively an item of media being experienced by another user in his or her friend's list. Thus, for example, if user Mark wished to purchase the song that user Adrian 500 was listening to, specifically the song "Faith" by George Michael, that could be facilitated by clicking on icon 910 and then subsequently clicking on the identifier 550 associated with that item of media, or another interface screen or query could be presented to prompt Mark to click on the icon or media item selection, or a drop down menu could be presented, and/or other known or hereafter to become known methods of providing the user with optional choices to select from based upon information appearing on the user's screen or data available to programs being interacted with by the user.

Thus, by providing the added functionality of electronic commerce to the enhanced messaging method and system presented herein, a provider of such an enhanced method and system will have the ability to reap additional profits and/or develop a closer affinity to its user population by providing ability to satisfy users' desires for items of media at or near the time they are actually experiencing the media. Additionally, a service provider providing a system and method such as that described herein may utilize the electronic commerce capability to associate itself with a business partner such that when a user selects a button or icon such as 901 or 910 described above, the user would be directed to a business partner's electronic commerce site to complete the user's impulse purchase, which can be a source of additional revenue for the service provider as well as for the commerce provider partner. Alternatively, if the provider of the system and method of the instant messaging system and method described herein also has its own commerce capability, this would enhance its user relationship, increase profit potential and develop a deeper affinity by directing its users to its own commerce sites to complete their impulse purchases based upon the media being experienced utilizing the enhanced system and method of messaging as described herein.

The commerce functions described above can be carried out by other servers 110 (see FIG. 1) which servers are either operated by the service provider controlling the instant messaging servers 106 and media servers 108, or other commerce providers affiliated with or associated with the operator of the instant messaging service. Thus, it is not necessary for the IM servers 106, media servers 108 or other servers 110 which provide additional functionality to be owned, operated or controlled by the same entity but rather can be operated through business associations and affiliations to provide the enhanced services as described herein. It will be recognized that the user can obtain content via download, or by having a CD copy sent, or any other method by which content can be transferred or otherwise made available.

Although much of the above description is expressed in reference to an instant messaging environment, it should be appreciated that it can be utilized in reference to any communication system where a user wishes to make their availability known to other users and wishes to share information or experiences (e.g., music that they are listening to) with other users.

Those skilled in the art will recognize that the method and system of the present invention has many applications, may be implemented in many manners and, as such, is not to be limited by the foregoing exemplary embodiments and examples. In other words, functional elements may be performed by single or multiple components, in various combinations of hardware and software, and individual functions can be distributed among software applications at the client or server level, as desired. In this regard, any number of the features of the different embodiments described herein may be combined into one single embodiment and alternate embodiments having fewer than or more than all of the features herein described are possible. Moreover, the scope of the present invention covers conventionally known and future developed variations and modifications to the system components described herein, as would be understood by those skilled in the art.

The invention claimed is:

1. An instant messaging user interface displayed on a display of a computing device, the user interface executing on the computing device and comprising:
   a list of selected users and a media player visibly displayed to a first user on the display of the computing device, wherein the list of selected users further comprises:
   a user identifier identifying a second user of a messaging program, the messaging program implemented via the computing device;
   a selectable status indicator visibly displayed adjacent to the user identifier on the display of the computing device, the status indicator identifying a playlist title, the playlist title representing a playlist created by the second user, the playlist comprising a plurality of media items, the plurality comprising second user media that the second user is experiencing at a time the status indicator is displayed, wherein selection of the status indicator enables experience of one or more of the plural media items of the playlist; and
   a commerce icon visibly displayed on the display of the computing device, the commerce icon initiates a commerce program through which one or more of the plural media items of the playlist may be obtained.

2. A system comprising:
   a first user communication program made available by a service provider, the first program executing on a first processor;
   a second user communication program made available by the service provider, the second program executing on a second processor;
   a messaging server in communication, over a network, with said first program executing on the first processor and said second program executing on the second processor, which messaging server provides to a second user a status indicator associated with an identifier of a first user in a selected user list displayed to the second user, the status indicator associated with the first user and identifying a playlist title, the playlist title representing a playlist created by the first user, the playlist comprising a plurality of media items, the plurality comprising media content being experienced by the first user at a time the status indicator is provided, wherein selection of the status indicator by the second user enables experience of one or more of the plural media items of the playlist, the status indicator displayed to the second user being changed dynamically based on a change in playlist being experienced by the first user;
   a media server that communicates, over the network, with said messaging server and selectively sends media content associated with the playlist being experienced by the first user to the second user after the second user interacts with the status indicator; and
   an additional server by way of which either the first user or the second user or both of them may, by interacting with a commerce icon made available by each user's respective communication program, gain access to a commerce program through which one or more of the plural media items of the playlist being experienced by the first user may be obtained.

3. An instant messaging user interface visibly displayed on a display of a computing device, the user interface executing on the computing device and comprising:
   a list of selected users and a media player visibly displayed to a first user on the display of the first computing device, wherein the list of selected users further comprises:
   a user identifier identifying a second user of a messaging program, the messaging program implemented via the computing device;
   a selectable status indicator displayed adjacent to the user identifier on the display of the computing device, the status indicator representing a URI of a webpage being viewed by the second user on the second processor at a time the status indicator is displayed, wherein selection of the status indicator enables experience of the webpage, and wherein the status indicator is changed dynamically based on a change in webpage being experienced by the second user; and
   a commerce icon visibly displayed on the display of the computing device, the commerce icon initiates a commerce program through which media associated with the webpage may be obtained.

* * * * *